Patented Oct. 23, 1951

2,572,223

UNITED STATES PATENT OFFICE 2,572,223

SEPARATION OF PETROLEUM-IN-WATER EMULSIONS

Abraham Shapiro, Pasadena, and Albert F. Clark, Los Angeles, Calif., assignors to Socony-Vacuum Oil Company, Incorporated, New York, N. Y., a corporation of New York No Drawing. Application August 5, 1950, Serial No. 177,958

10 Claims. (Cl. 252—330)

This invention relates to the treatment of emulsions of petroleum in water to facilitate separation of the two liquid phases. The present application is a continuation-in-part of our copending application Serial Number 116,406, filed September 17, 1949, entitled "Separation of Petroleum-in-Water Emulsions."

Numerous methods have been employed for separating intermingled water and petroleum, including various types of treatment by heat, electricity, centrifugal force, filtration, and addition of chemicals. But nearly all of the existing methods are concerned with the usual variety of oilfield emulsion, in which the petroleum is the external or continuous phase and the water is the internal or dispersed phase. The present invention is concerned with the opposite variety of emulsion, in which the water is continuous and the oil is dispersed.

Although the latter variety of emulsion is less usual, it occurs frequently enough to constitute a serious problem. Many oil wells produce large quantities of water; in some cases the volume of water is far in excess of the volume of oil. In such circumstances the oil or a portion of the oil is likely to become dispersed in the water. Fairly good separation of such dispersions by simple settling is usually possible if sufficient time is allowed; however, the aqueous layer generally retains enough oil to create dangers of stream pollution and the like, and the time required for even moderately good separation is disadvantageous.

Some chemicals of the group known as surface-active agents have been found to be effective for resolving these emulsions, but such chemicals are costly and they must be used in considerable quantity to create effective concentrations when the volume of the aqueous phase is very great.

We have discovered that the addition of minute proportions of a salt of permanganic acid to the aqueous phase is remarkably effective in resolving emulsions of petroleum in water. So far as results of the method are concerned, it does not matter which of the permanganates is chosen; in a dilute, more or less saline solution, the added salt loses its identity through dissociation and ion exchange, and its effectiveness is due solely to the permanganate radical. For reasons of availability and cost, we prefer the permanganates of potassium, sodium, and calcium. Of these the potassium salt is ordinarily the least expensive and the most readily available, while the sodium and calcium salts are somewhat more convenient for use because of their being more easily soluble in water.

In treating predominantly aqueous, petroleum-in-water emulsions, we have obtained excellent results by the addition of a permanganate in proportions of 1.5 to 5 parts per million of the permanganate radical with respect to the liquid treated, the smaller amounts being useful when the proportion of dispersed petroleum in the water is low. In some cases the aqueous phase may include oxidizable material; e. g., the formation water may contain dissolved ferrous compounds or there may be a growth of algae and other organisms in a tank or sump. Organisms are here considered as portions of the aqeous phase since they consist chiefly of water-permeable systems of colloids and solutes. In such cases the permanganate should be added in greater proportions in order to leave 1.5 to 5 parts per million of the permanganate radical after the oxidation reactions in the aqueous phase have occurred.

We do not know of an upper limit of proportions beyond which the permanganate is ineffective for demulsification; however, it is obviously uneconomic to use much more of the reagent than is required to produce the desired effect.

We have also discovered that effectiveness of the permanganate is dependent upon the pH of the aqueous phase of an emulsion. When the pH of the water is less than about 7.0, addition of permanganate is of little or no benefit in resolving the emulsion. When the pH is about 7.0, the permanganate is moderately effective and yields demulsification adequate to meet requirements in cases where the requirements are lenient. At higher pH values, up to about 9.0, the effectiveness of the permanganate increases as the pH increases.

The water associated with petroleum is ordinarily mildly alkaline, pH values of 8.0 to 8.2 being common. Emulsions of petroleum in such water respond satisfactorily to treatment with permanganate, without adjustment of the pH. However, the degree and rapidity of separation can be improved by the addition of sodium hydroxide, sodium carbonate, or other alkalizing agent to the water to increase the pH. When the water is originally about neutral, adjustment of the pH is in most cases very desirable, and, when the water is originally acidic, adjustment of the pH is essential.

Increasing the alkalinity of the water beyond pH 9.0 yields little if any further improvement in results and is disadvantageous because of excessive consumption of the alkalizing agent and because of undesirably high alkalinity in the waste water.

Explanation of the effectiveness of the herein disclosed method in the treatment of petroleum-in-water emulsions falls within the realm of conjecture. Presumably oxidation reactions are responsible for the demulsification, but it is not possible to identify or even to detect the products of such reactions. Furthermore, the theory of petroleum emulsions is uncertain and frequently nonproductive of useful conclusions.

It is known that permanganates, at least in strong solution, are capable of oxidizing certain hydrocarbon components of petroleum (e. g., alkylated aromatics) to carboxylic acids and that carboxylic acids and their salts belong to the broad class of substances which is known to yield demulsifying agents. However, carboxylic acids and carboxylates are not outstandingly effective for breaking emulsions and, when not carefully chosen, are at least as likely to stabilize oil-in-water emulsions as to resolve them.

It is generally believed that petroleum emulsions are due, at least in part, to surface-active substances which are native components of the petroleum and which act as stabilizing agents for liquid dispersions. These substances are presumably compounds of oxygen or nitrogen or both, although other elements capable of imparting polar or semipolar characteristics to portions of predominantly hydrocarbon molecules may also be involved. It is reasonable to surmise that the oxidizing effect of the permanganate in the aqueous phase is selective for the particular molecules which are actively functioning to stabilize the emulsion. Those molecules are necessarily situated at the interfaces and may occupy a high proportion of the interfacial area, and presumably they are more reactive than their strictly hydrocarbon neighbors and in more effective electrochemical contact with the aqueous phase. It could not be predicted that oxidation of those molecules might reverse or materially decrease their emulsifying power, but there is no reason to believe that such an effect does not occur.

Other oxidizing agents which we have tried, such as calcium hypochlorite, sodium hypochlorite, and hydrogen peroxide, have not been effective. The superiority of permanganates over other oxidizing agents may be due merely to differences in strength and nature of the oxidation reactions, but it is also possible that by-products of the reactions enter into the demulsifying process; for example, it may be that the manganese dioxide precipitated at the interfaces alters the nature of the colloidal system which is believed by many to form protective envelopes around the dispersed globules.

The favorable effect of an increase in pH upon the demulsification is not according to normal expectation, since it is known that, in general, the activity of dissolved permanganates diminishes as the pH of the solutions increases. It is possible that the hydroxyl ion functions merely as an inhibiting agent to prevent premature decomposition of the permanganate, but it is also possible that the hydroxyl ion cooperates actively in the chemical and physical reactions which yield the demulsification.

In the practice of this method, the commingled water and petroleum, preferably after a preliminary separation step to remove non-emulsified petroleum, is run into a tank or sump of sufficient size to retain the liquid in a quiescent body. If the pH of the water is so much less than 9.0 that the use of permanganate will not yield the degree of demulsification desired, a solution of alkali is added to the water to increase the pH, preferably to as near 9.0 as is permitted by the economics of a particular situation, with due regard for the cost of alkali and for the required completeness and rapidity of demulsification.

Either subsequently to the addition of alkali or simultaneously, an aqueous solution of permanganate of any convenient concentration is added to the continuous aqueous phase in amount sufficient to introduce 2 to 7 parts per million of potassium permanganate or an equivalent amount of other permanganate to the total liquid. When the aqueous phase includes oxidizable matter, additional permanganate is required, and it is possible that some kinds of petroleum, which we have not yet encountered in the practice of this method, may require heavier dosage of permanganate irrespective of the nature of the water.

The addition of the alkali and the permanganate may be by any method which insures distribution of the agents throughout the water; for example, the solution or solutions may be simply poured into the tank or sump at scattered points, or may be introduced through a system of perforated distributing pipes immersed in the aqueous layer, or may be injected intermittently or continuously into the inlet line or into the tank or sump near the inlet. It is desirable, however, to avoid methods which would subject the permanganate to unnecessary reduction by the petroleum before it is able to function as a demulsifying agent. For example, the permanganate solution should not be sprayed over the surface of a sump which has a supernatant layer of petroleum, and it should not be injected into the inlet line at a great distance from the tank or sump or upstream of a pump, valve, or elbow which creates a high degree of turbulence in the flowing liquid. If the alkali solution is separate from the permanganate solution, it may be added to the water in any manner and at any time prior to the addition of the permanganate.

The treated, commingled liquid is retained in the quiescent body while separation into layers of petroleum and water occurs, and the two liquids are then separately withdrawn, either continuously or intermittently. The withdrawn water is so free of oil that it can be discharged to streams without danger of pollution. The withdrawn petroleum may be substantially free of water or it may contain dispersed water; in the latter case the known processes for dehydration of water-in-oil emulsions are applicable.

We claim as our invention:

1. The method of resolving an emulsion of petroleum in water which comprises: adjusting the pH of the aqueous phase of the emulsion to within the range 7.0 to 9.0, and adding to said aqueous phase a salt of permanganic acid in proportions of at least 1.5 parts per million of the permanganate radical with respect to the total liquid treated.

2. The method of resolving an emulsion of petroleum in water which comprises: adjusting the pH of the aqueous phase of the emulsion to within the range 7.0 to 9.0, and adding to said aqueous phase a salt of permanganic acid in amount sufficient to react with oxidizable material of the aqueous phase and to leave an excess of at least 1.5 parts per million of the permanganate radical with respect to the total liquid treated.

3. The method of removing dispersed petroleum from water which comprises: adjusting the pH of said water to within the range 7.0 to 9.0, adding to said water a salt of permanganic acid in amount sufficient to introduce at least 1.5 parts per million of the permanganate radical with respect to the total liquid treated, retaining the treated petroleum-bearing water in a quiescent body while gravimetric separation occurs, and separately withdrawing water and petroleum from said body.

4. The method of resolving an emulsion of petroleum in water which has a pH substantially less than 9.0 comprising: increasing the pH of said water to a new value within the range pH 7.0 to pH 9.0, and adding to said water a salt of permanganic acid in proportions of at least 1.5 parts per million of the permanganate radical with respect to the total liquid treated.

5. The method of resolving an emulsion of petroleum in water which has a pH substantially less than 9.0 comprising: increasing the pH of the aqueous phase of the emulsion to a new value within the range pH 7.0 to pH 9.0, and adding to said aqueous phase a salt of permanganic acid in amount sufficient to react with oxidizable material of the aqueous phase and to leave an excess of at least 1.5 parts per million of the permanganate radical with respect to the total liquid treated.

6. The method of removing dispersed petroleum from water which has a pH substantially less than 9.0 comprising: increasing the pH of said water to a new value within the range pH 7.0 to pH 9.0, adding to said water a salt of permanganic acid in amount sufficient to introduce at least 1.5 parts per million of the permanganate radical with respect to the total liquid treated, retaining the treated petroleum-bearing water in a quiescent body while gravimetric separation occurs, and separately withdrawing water and petroleum from said body.

7. The method of resolving emulsions of petroleum in water having a pH of at least 7.0 which comprises adding to the aqueous phase thereof a salt of permanganic acid in proportions of at least 1.5 parts per million of the permanganate radical with respect to the total liquid treated.

8. The method of resolving emulsions of petroleum in water having a pH of at least 7.0 which comprises adding to the aqueous phase thereof an aqueous solution including the permanganate radical, in amount sufficient to introduce at least 1.5 parts per million of said permanganate radical with respect to the total liquid treated.

9. The method of resolving emulsions of petroleum in water having a pH of at least 7.0 which comprises adding to the aqueous phase thereof a salt of permanganic acid in amount sufficient to react with oxidizable material of the aqueous phase and to leave an excess of at least 1.5 parts per million of the permanganate radical with respect to the total liquid treated.

10. The method of removing dispersed petroleum from water having a pH of at least 7.0 which comprises: adding to the water a salt of permanganic acid in amount sufficient to introduce at least 1.5 parts per million of the permanganate radical with respect to the total liquid treated, retaining the treated petroleum-bearing water in a quiescent body while gravimetric separation occurs, and separately withdrawing petroleum and water from said body.

ABRAHAM SHAPIRO.
ALBERT F. CLARK.

REFERENCES CITED

The following references are of record in the file of this patent:

UNITED STATES PATENTS

| Number | Name | Date |
|---|---|---|
| 2,064,541 | Hershman | Dec. 15, 1936 |
| 2,539,478 | Roberson | Jan. 30, 1951 |